United States Patent [19]

Shotey

[11] Patent Number: 4,803,307

[45] Date of Patent: Feb. 7, 1988

[54] WEATHERPROOF OUTLET COVER

[76] Inventor: Michael J. Shotey, 7733 E. Cypress, Scottsdale, Ariz. 85257

[21] Appl. No.: 66,993

[22] Filed: Jun. 29, 1987

[51] Int. Cl.$^4$ .............................................. H02G 3/18
[52] U.S. Cl. .................................................... 174/67
[58] Field of Search ........................ 174/67; 220/242; 439/133, 135, 136, 142, 144, 147

[56] References Cited

U.S. PATENT DOCUMENTS

| | | | |
|---|---|---|---|
| 2,514,745 | 6/1950 | Kilgore | 220/242 X |
| 4,109,095 | 8/1978 | Kling | 174/67 |
| 4,424,407 | 1/1984 | Barbic | 174/67 |
| 4,603,932 | 8/1986 | Heverly | 439/147 |
| 4,605,817 | 8/1986 | Lopez | 174/67 |

Primary Examiner—A. T. Grimley
Assistant Examiner—David A. Tone
Attorney, Agent, or Firm—Cahill, Sutton & Thomas

[57] ABSTRACT

A weatherproof outlet cover is provided for fitting over an outdoor electric outlet. The cover comprises a mouting plate which is demountably secured to the outlet housing in place of a conventional face plate, and a lid member which is demountably and pivotably mounted over the mounting plate. At least one access slot is provided in the bottom of the lid member for enabling a corresponding number of electrical cords to be extended therethrough. A first sealing member is disposed between the mounting plate and the wall which surrounds the outlet housing, and a second sealing member is disposed between the lid member and the mounting plate, in order to prevent foreign matter from entering the outlet.

18 Claims, 1 Drawing Sheet

U.S. Patent   Feb. 7, 1989   4,803,307
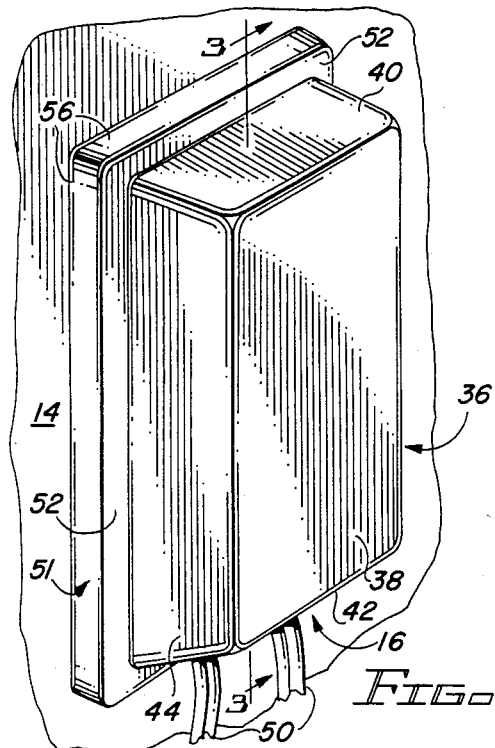
FIG.-1
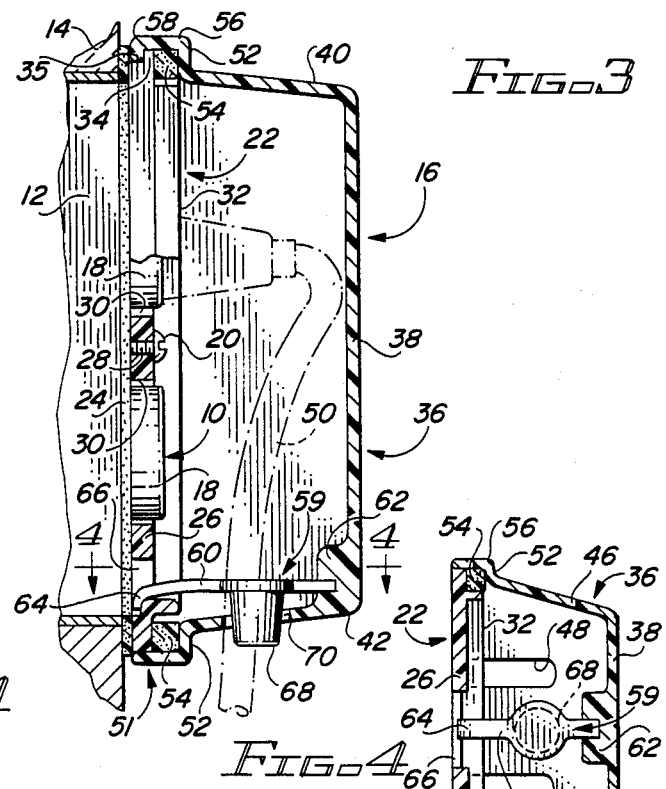
FIG.-3
FIG.-4
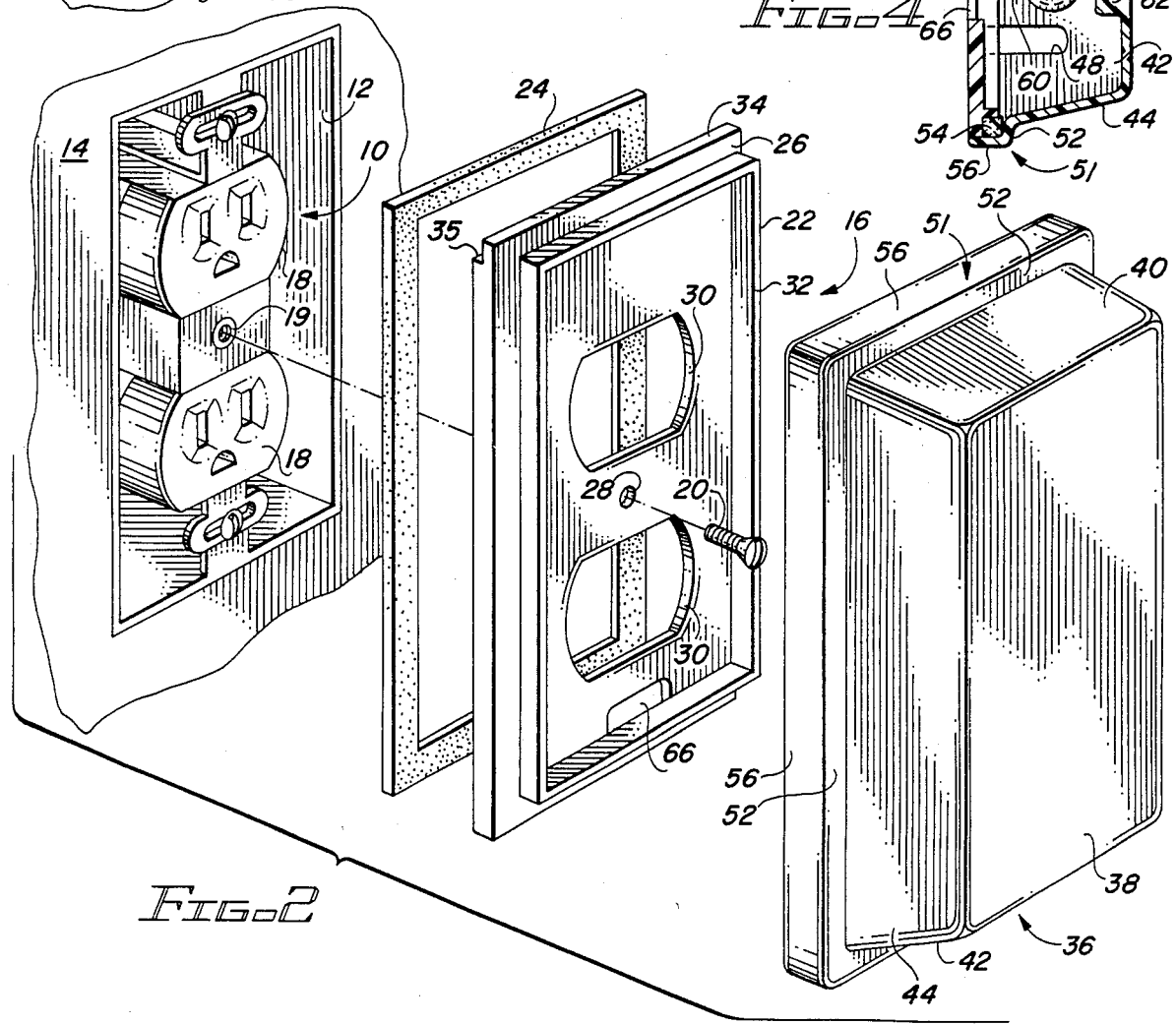
FIG.-2

WEATHERPROOF OUTLET COVER

BACKGROUND OF THE INVENTION

1. Field of the Invention

This invention relates in general to protective covers for electrical outlets and, more particularly, to a weatherproof cover for fitting over an outdoor outlet.

2. Description of the Prior Art

Household electrical outlets are very often situated in outdoor locations so that homeowners may conveniently plug in various outdoor appliances such as electric weed trimmers, sprinkler systems, outdoor lighting, and the like. These outlets are significantly more vulnerable to contamination from dirt, water, and other foreign matter than outlets which are located indoors. As a result, outdoor outlets are usually provided with some type of protective cover for preventing the entry of contaminants.

The most common type of outdoor outlet cover at present comprises a spring-biased lid member which is hingedly connected to the face plate of the outlet and swingable from a closed position covering and tightly sealing off the plug receptacles of the outlet to an open position allowing access to the receptacles. Very often, an electrical outlet comprises a single face plate with a number of plug receptacles formed therein. In such instances, a plurality of the above-described lid members are provided, with each lid corresponding to a different one of the receptacles so that each receptacle may be covered and uncovered independently of the others.

A major problem with the above type of outlet cover is that the hinged lids provide protection only while the receptacles are not in use. As soon as a lid is swung open to allow an electrical appliance to be plugged into a receptacle, that receptacle is open to the elements and thus vulnerable to damage from moisture and the like. Another problem is that the spring arrangement required to bias the lids to a closed position is somewhat complex to manufacture and adds to the final cost of the product.

Various types of outlet covers are also available for mounting over indoor electrical outlets. One indoor outlet cover of particular interest is disclosed in U.S. Pat. No. 4,603,932 to Heverly. The cover described in the Heverly patent is a box-like structure comprising a base frame screwably attachable to the existing receptacle face plate for seating thereon and an open sided cover box which slips within the frame. The cover box is locked to the base frame by means of protruding tabs which are received in dovetail fashion by cutouts in the frame. The sides of the box carrying the protruding tabs are flexible enough to allow the tabs to slide out of their receiving cut outs when squeezed by an adult, but rigid enough to be considered "child-proof". However, because the purpose of this type of cover is to "child-proof" the outlet rather than to weatherproof it, no means are provided for preventing the entry of water and dirt. Thus, such covers are unsuitable for use with outdoor outlets.

Therefore, a need exists for a new and useful weatherproof outlet cover which overcomes some of the problems and shortcomings of the prior art.

SUMMARY OF THE INVENTION

In accordance with the present invention a new and improved weatherproof cover is provided for protecting an outdoor electrical outlet.

The weatherproof cover assembly includes a special mounting plate which replaces the conventional face plate of the electrical outlet, and a lid, or closure member which is movably, and preferably demountably attached to the mounting plate. Both the mounting plate and the lid member are formed of a rugged, waterproof, corrosion resistant and electrically non-conductive material such as a heavy-duty synthetic resin, or plastic.

The mounting plate is in the form of a generally planar base having a centrally located hole formed therethrough for receiving the usual screw fastener which secures the mounting plate to the electrical outlet in the same manner as the usual face plate which it replaces. The base is provided with at least one cutout for exposing a corresponding number of plug receptacles of the electric outlet, and since most standard electric outlets have two plug receptacles, the weatherproof cover assembly of the present invention is shown and described herein as being configured to accommodate such two-receptacle outlets. The base of the mounting plate further includes a normally extending ridge which is disposed to surround the cutouts of the base at a position between the cutouts and the peripheral edges of the base. For reasons which will hereinafter be described, the base member is further provided with an upstanding flange on the upper edge thereof which is flush with the front face of the base and recessed relative to the back face to provide a groove immediately behind the flange. Also, an aperture is formed through the base member preferably at a location immediately above the bottom horizontal leg of the above mentioned normally extending ridge.

A first sealing gasket is provided for placement between the rear face of the base of the mounting plate and the wall surface which surrounds the electric outlet to prevent moisture, dirt and other contaminating materials from passing therebetween.

The lid, or closure, member is provided in the form of an open-backed box-shaped structure having a front wall, bottom wall, top wall and an opposed pair of side walls. The lid member is configured so that the plugs of conventional electric cords (two in the illustrated embodiment) may be mounted in the receptacles of the electrical outlet, with the lid member enclosing those installed plugs in a weatherproofing manner. At least one rearwardly opening slot, and preferably two are formed through the bottom wall of the lid member to allow the cord portions of the installed plugs to extend from the weatherproof cover assembly.

A peripheral flange extends normally and outwardly from the rearmost edge of the top, bottom and side walls of the lid member so as to define a ledge for supporting a second sealing member as will be described later. A lip element extends normally and rearwardly from the outermost edge of the peripheral flange of the lid member to closely encircle the mounting plate when the lid member is mounted thereon and in the closed position. The top portion of the lip element is provided with an inwardly turned hook portion which fits over the elongated top flange into the groove of the mounting plate, thus pivotably and demountably connecting the lid member to the mounting plate.

The second sealing member comprises a strip of weatherstripping material which is glued or otherwise secured to the inner surface of the ledge defined by peripheral flange of the lid member, and which extends continuously along the top and side edges of the lid member, but only partially along the bottom edge so as not to interfere with the rearwardly extending access slot or slots. When the lid member is pivoted downwardly into its closed position, the sealing strip substantially fills the gap between the raised ridge on the front surface of the base of the mounting plate and the rearwardly extending lip element of the lid member, thus effectively preventing foreign matter from passing therebetween. The lid member will not be completely sealed in the area of the access slot or slots, but this is not expected to detract from its overall weather resistance, since the amount of dust, moisture and the like capable of moving upwardly from underneath the lid member would be negligible in any case.

The lid member is releasably held in a closed position over the mounting plate by means of a suitable latching mechanism. The latching mechanism preferably comprises a resilient leaf spring having one end fixed in the front wall of the lid member and having its opposite end formed as a hook receivable in the aperture provided proximate the bottom of the base of the mounting plate as hereinbefore mentioned. The central portion of the leaf spring is formed as a button which projects downwardly through a hole formed in the bottom wall of the lid member. to release the latching mechanism, it is simply necessary to push upwardly on the bottom, causing the hooked end of the leaf spring to disengage from the aperture in the mounting plate. The lid member can then be either removed entirely from the mounting plate, or simply pivoted upwardly about the top flange of the mounting plate, allowing electrical cables to be fed through the access slots and plugged into or removed from the outlet receptacles as desired.

Therefore, it is an object of this invention to provide a new and improved weatherproof outlet cover assembly for protecting an outdoor electrical outlet, even when the outlet receptacles are in use.

Another object of the invention is to provide a weatherproof outlet cover which is inexpensive and easy to install in place of a conventional face plate.

Still another object of the invention is to provide a weatherproof outlet cover comprising a mounting plate for installation on the wall surrounding the outlet, a lid member pivotably attached to the mounting plate, a first sealing member between the mounting plate and the wall, and a second sealing member between the lid member and the mounting plate.

The foregoing and other objects of the present invention, as well as the invention itself, may be more fully understood from the following description when read in conjunction with the accompanying drawings.

BRIEF DESCRIPTION OF THE DRAWINGS

FIG. 1 is a perspective view showing the weatherproof outlet cover assembly of the present invention.

FIG. 2 is a perspective view showing the elements of the outlet cover assembly in exploded relationship to one another and to an outlet.

FIG. 3 is a sectional view taken through line 3—3 of FIG. 1.

FIG. 4 is a sectional view taken through line 4—4 of FIG. 3.

DESCRIPTION OF THE PREFERRED EMBODIMENTS

Referring more particularly to the drawings, FIG. 2 shows a conventional electrical outlet 10 contained within a housing 12 that is mounted in a suitable opening provided in a building wall 14 in the usual manner. The various elements of the outlet cover assembly 16 according to the present invention are shown in exploded relationship relative to the electrical outlet.

As is well known in the art, the outlet 10 is mounted in the housing 12 and has at least one plug-in receptacle 18 (two shown). An internally threaded hole 19 is provided in the center of the electric outlet 10 for receiving a fastener such as a screw 20 which ordinarily secures a conventional face plate (not shown) to the housing. In order to install the weatherproof cover assembly of the present invention, the conventional face plate is removed and a specially configured mounting plate 22 substituted therefore. In addition, a first sealing member such as a gasket 24 must be installed between the mounting plate 22 and the wall 14 to prevent moisture, dirt, and other foreign materials from passing therebetween.

The mounting plate 22 comprises a generally flat base member 26 having a hole 28 in its center for receiving fastener 20 which secures it to outlet housing 12. The base member 26 is provided with at least one cut-out 30 (two shown) for exposing the corresponding number of plug-in receptacles 18 of the outlet. A raised ridge 32 is formed on the front surface of the base member 26, circumscribing the cut-outs 30. In addition, an elongated flange member 34 extends upwardly along the upper edge of the base member 26 and is flush with the outer face thereof and is recessed relative to the back face to provide a groove 35, for pivotably supporting a lid member 36.

The lid member 36 comprises an open-backed box-shaped structure having a front wall 38 and top, bottom and side walls 40, 42, 44 and 46, respectively which are preferably tapered as shown. At least one rearwardly opening access slot 48 (two shown) is defined in the bottom wall 42 of the lid member 36 for allowing a corresponding number of electrical cords 50 to be extended therethrough. A projecting rim structure 51 extends around the perimeter of the lid member 36 to closely encircle mounting plate 22 when the lid member is mounted thereon and is in its closed position. The rim structure comprises a peripheral flange 52 which extends normally and outwardly from the rear edges of the top, bottom and side walls 40, 42, 44, 46, and defines a ledge for supporting a second sealing member 54 as will be described later, and a lip element 56 which extends normally and rearwardly from the outer edge of the peripheral flange 52. The top portion of lip element 56 comprises an inwardly turned hook portion 58 which fits over the elongated top flange 34 into the groove 35 of the mounting plate 22, thus forming a pivotable demountable interconnection therewith.

The second sealing member 54 comprises a strip of weatherstripping material which is glued or otherwise affixed to the inner surface of the ledge defined by peripheral flange 52 of the lid member 36, and which extends continuously along the top and side portions of the lip element 56, but only partially along the bottom portion, so as not to interfere with the access slots 48. When the lid member 36 is pivoted downwardly into its closed position, the strip 54 cooperates with the raised ridge 32 on the front surface of the mounting plate 22 to form a tight seal effectively preventing foreign matter from passing between the lid member 36 and the mounting plate 22. The lid member 36 will not be completely sealed in the area of the access slots 48, but this is not expected to detract from its overall weather resistance, since the amount of dust, moisture and the like capable of moving upwardly from underneath the lid member 36 would be negligible in any case.

The lid member 36 is releasably held in a closed position over the mounting plate 22 by means of a suitable latching mechanism. The latching mechanism 59 preferably comprises a resilient leaf spring 60 having one end fixedly secured in a reinforced portion 62 of the front wall 38 of the lid member 36, and its opposite end formed as a hook 64 receivable in an aperture 66 in the bottom of the mounting plate 22. The central portion of the leaf spring 60 is formed as a button 68 which projects downwardly through a hole 70 in the bottom wall of the lid member 36. To release the latching mechanism, it is simply necessary to push upwardly on the button 68, causing the hooked end 64 of the leaf spring 60 to disengage from the aperture 66 of the mounting plate 22. The lid member 36 can then be lifted completely off the mounting plate 22, or simply pivoted upwardly about the top flange 34 of the mounting plate 22, allowing electrical cables 50 to be fed through the access slots 48 and plugged into or removed from the outlet receptacles as desired.

Both the mounting plate 22 and the lid member 36 of the present invention may be simply and inexpensively made from rugged, waterproof, corrosion resistant and electrically non-conductive materials such as heavy duty plastic using conventional molding operations or other well-known processes.

While the principles of the invention have now been made clear in the illustrated embodiments, there will be immediately obvious to those skilled in the art, many modifications of structure, arrangements, proportions, the elements, materials and components used in the practice of the invention and otherwise, which are particularly adapted for specific environments and operation requirements without departing from those principles. The appended claims are therefore intended to cover and embrace any such modifications within the limits only of the true spirit and scope of the invention.

I claim as my invention:

1. A weatherproof cover for an outdoor electrical outlet, said cover comprising:
   (a) a waterproof, corrosion-resistent, and electrically non-conductive mounting plate;
   (b) fastener means for demountably securing said mounting plate to the outlet;
   (c) said mounting plate including a top edge and a lip formed in said top edge;
   (d) a waterproof, corrosion-resistant lid member for enclosing the outdoor electrical outlet and the plug of at least one electrical cord mountable therein, said lid member being movably attached to said mounting plate and having at least one access slot formed therein for allowing the electrical cord portion of the plug to extend from said lid member;
   (e) said lid member including a top wall and a hook portion depending from said top wall for engaging said lip to pivotally engage said lid member with said mounting plate;
   (f) a first sealing member for disposition between said mounting plate and the outlet for preventing passage of foreign elements therebetween; and
   (g) a second sealing member disposed between said mounting plate and said lid member for preventing passage of foreign elements therebetween.

2. The weatherproof cover according to claim 1, further comprising a latching mechanism for releasably maintaining said lid member in a closed position over said mounting plate.

3. The waterproof cover according to claim 1, in which said first sealing member comprises a gasket for placement between the outlet and said mounting plate.

4. The weatherproof cover according to claim 1, in which said second sealing member comprises a strip of weatherstripping material mounted inside said lid member.

5. A weatherproof cover for an outdoor electrical outlet, said cover comprising:
   (a) a waterproof, corrosion-resistant, and electrically non-conductive mounting plate;
   (b) fastener means for demountably securing said mounting plate to the outlet;
   (c) a waterproof, corrosion-resistant lid member for enclosing the outdoor electrical outlet and the plug of at least one electrical cord mountable therein, said lid member being movably attached to said mounting plate and having at least one access slot formed therein for allowing the electrical cord portion of a mountable electrical cord to extend from said lid member;
   (d) a first sealing member for disposition between the mounting plate and the outlet for preventing passage of foreign elements therebetween;
   (e) a second sealing member disposed between said mounting plate and said lid member comprising a strip of weatherstripping material inside said lid member for preventing passage of foreign elements therebetween; and
   (f) a raised ridge formed on said mounting plate for cooperating with said second sealing member to improve its sealing ability and prevent foreign elements from passing between said mounting plate and said lid member.

6. A weatherproof cover for an outdoor electrical outlet of the type including an outlet housing contained within an opening in a building wall and at least one plug-in receptacle, with a hole being provided in the center of the outlet for receiving a fastener which ordinarily secures a conventional face plate to the housing, said cover comprising:
   (a) a waterproof, corrosion-resistant, and electrically non-conductive mounting plate for mounting to the outlet housing in place of the conventional face plate, said mounting plate including a base member having at least one cut-out defined therein for exposing the at least one plug-in receptacle of the outlet and at least one hole alignable with the hole in the outlet housing for receiving a fastener;
   (b) fastener means for extending through the alignable holes in the outlet and said mounting plate for demountably securing said mounting plate to the outlet housing;
   (c) a waterproof, corrosion-resistant, open-backed lid member for covering said mounting plate, said lid member including,
      (I) a closed front wall,
      (II) a pair of spaced apart side walls,
      (III) a top wall,
      (IV) a bottom wall, said bottom wall having at least one rearwardly opening access slot defined therein for allowing at least one electrical cord to be extended therethrough, and
(V) a rim structure extending around the perimeter of said lid member so as to closely encircle said mounting plate when said lid member is mounted in a closed position on said mounting plate;
(d) a first sealing member for disposition between said mounting plate and the building wall surrounding the outlet for preventing passage of foreign materials therebetween; and
(e) a second sealing member for disposition between said lid member and said mounting plate.

7. The weatherproof cover of claim 6, further comprising cooperating elements of a demountable interconnection on said mounting plate and said lid member for pivotably securing said lid member to said mounting plate.

8. The weatherproof cover of claim 7, in which said cooperating elements of a demountable interconnection comprise:
(a) an elongated flange member extending upwardly along the upper edge of said base member of said mounting plate; and
(b) an inturned hook portion on said rim structure of said lid member for fitting over said elongated top flange of said mounting plate to form a pivotable connection therewith.

9. The weatherproof cover of claim 8, in which said rim structure on said lid member comprises:
(a) a peripheral flange extending normally and outwardly from the rearmost edges of said top, bottom and side walls of said lid member, said peripheral flange defining a ldge for supporting said second sealing member; and
(b) a lip element extending normally and rearwardly from the outer edge of said peripheral flange, said inturned hook portion of said rim structure being formed along the rear edge of said lip element.

10. The weatherproof cover of claim 9, in which said second sealing member comprises a strip of weatherstripping material affixed to the inner surface of said ledge and extending continuously along the top and side portions of the lip element and partially along the bottom portion thereof.

11. The weatherproof cover of claim 10, further comprising means on said mounting plate for cooperating with said second seal member to improve its sealing ability and prevent foreign matter from passing between said mounting plate and said lid member when said lid member is in a closed position over said mounting plate.

12. The weatherproof cover of claim 11 in which said means on said mounting plate comprises a raised ridged formed on the front surface of said base member, and circumscribing said at least one cut-out.

13. The weatherproof cover of claim 6, in which said first sealing member comprises a gasket for disposition between the outlet and said mounting plate.

14. The weatherproof cover of claim 6, further comprising a latching mechanism for releasably maintaining said lid member in a closed position over said mounting plate.

15. The weatherproof cover of claim 14, in which said latching mechanism comprises:
(a) a resilient leaf spring having one end fixedly secured in said front wall of said lid member;
(b) a hook formed at the opposite end of said leaf spring;
(c) a push button depending from said leaf spring;
(d) an aperture formed in the bottom of said mounting plate for releasably receiving said hook at the end of said leaf spring; and
(e) a hole formed in said bottom wall of said lid member for exposing said push button.

16. A weatherproof electrical outlet comprising:
(a) an outlet housing contained within an opening in a building wall;
(b) at least one plug-in receptacle in said outlet housing;
(c) a waterproof, corrosion resistant, and electrically non-conductive mounting plate demountably secured to said outlet housing, said mounting plate including,
(I) a base member having at least one cut-out defined therein for exposing said at least one plug-in receptacle,
(II) a raised ridge formed on the front surface of said base member, circumscribing said at least one cut-out, and
(III) an elongated flange member extending upwardly along the upper edge of said base member of said mounting plate;
(d) a waterproof, corrosion-resistant, open-backed lid member for covering said mounting plate, said lid member including,
(I) a closed front wall,
(II) a pair of spaced apart side walls,
(III) a top wall,
(IV) a bottom wall, said bottom wall having at least one rearwardly opening access slot defined therein for allowing at least one electrical cord to be extended therethrough,
(V) a peripheral flange extending normally and outwardly from the rearmost edges of said top, bottom and side walls of said lid member, said peripheral flange defining a ledge;
(VI) a lip element extending normally and rearwardly from the outer edge of said peripheral flange; and
(VII) an inturned hook portion formed along the rear edge of the top of said lip element, for fitting over said elongated top flange of said mounting plate and forming a pivotable demountable interconnection therewith;
(e) a gasket for disposition between said mounting plate and the building wall surrounding said outlet for preventing passage of foreign materials therebetween; and
(f) a strip of weatherstripping material affixed to the inner surface of the ledge of said peripheral flange of said cover member and extending continuously along the top and side portions of said lip element and partially along the bottom portion thereof, said strip being disposed for cooperation with said raised ridge on said mounting plate to form a tight seal preventing entry of foreign material when said lid member is in a closed position over said mounting plate.

17. The weatherproof outlet of claim 16, further comprising a latching mechanism for releasably maintaining said lid member in a closed position over said mounting plate.

18. The weatherproof outlet of claim 17, in which said latching mechanism comprises:
(a) a resilient leaf spring having one end fixedly secured in said front wall of said lid member;

(b) a hook formed at the opposite end of said leaf spring;
(c) a push button depending from said leaf spring;
(d) an aperture formed in the bottom of said mounting plate for releasably receiving said hook at the end of said leaf spring; and
(e) a hole formed in said bottom wall of said lid member for exposing said push button.

* * * * *

UNITED STATES PATENT AND TRADEMARK OFFICE
CERTIFICATE OF CORRECTION

PATENT NO. : 4,803,307

DATED : Feb. 7, 1989

INVENTOR(S) : Shotey

It is certified that error appears in the above-identified patent and that said Letters Patent is hereby corrected as shown below:

On the title page Item [45]: Date of patent: "Feb. 7, 1988" should read Date of patent: --Feb. 7, 1989--.

Signed and Sealed this

Sixth Day of March, 1990

*Attest:*

JEFFREY M. SAMUELS

*Attesting Officer*  *Acting Commissioner of Patents and Trademarks*